(12) United States Patent
Lindsay

(10) Patent No.: US 7,899,320 B2
(45) Date of Patent: Mar. 1, 2011

(54) BATTERY PACKS

(75) Inventor: Richard Arthur Lindsay, Stowmarket (GB)

(73) Assignee: The Vitec Group PLC, Surrey (GB)

( * ) Notice: Subject to any disclaimer, the term of this patent is extended or adjusted under 35 U.S.C. 154(b) by 0 days.

(21) Appl. No.: 12/258,083

(22) Filed: Oct. 24, 2008

(65) Prior Publication Data

US 2009/0116831 A1     May 7, 2009

Related U.S. Application Data

(63) Continuation of application No. PCT/GB2007/001494, filed on Apr. 24, 2007.

(30) Foreign Application Priority Data

Apr. 24, 2006    (GB) ................................ 0608150.9

(51) Int. Cl.
    *G03B 7/26*     (2006.01)
    *G03B 17/00*    (2006.01)
    *H04N 5/68*     (2006.01)

(52) U.S. Cl. ....................... 396/278; 396/422; 396/424; 396/428; 348/375

(58) Field of Classification Search ................. 396/278, 396/419, 422, 424, 428; 348/373, 375
See application file for complete search history.

(56) References Cited

U.S. PATENT DOCUMENTS

| 7,724,303 | B2 | 5/2010 | DeSorbo |
| 2003/0118339 | A1 | 6/2003 | Yu et al. |
| 2004/0061765 | A1 | 4/2004 | Kan et al. |
| 2004/0241539 | A1 | 12/2004 | Katayama |

FOREIGN PATENT DOCUMENTS

DE        41 21 643       11/1992

*Primary Examiner*—Rochelle-Ann J Blackman
(74) *Attorney, Agent, or Firm*—McGuireWoods LLP

(57) ABSTRACT

A battery pack for mounting to a camera and camera stand is described. The battery pack has attachment means on opposite sides. The attachment means are of complementary design so that the battery pack can be mounted between the camera and the stand. Each attachment means permits linear adjustment of the camera. The two means provide parallel linear adjustment of the camera with respect to the battery pack and of the battery pack with respect to the stand.

20 Claims, 6 Drawing Sheets

BATTERY PACKS

CROSS-REFERENCE TO RELATED APPLICATIONS

This application is a continuation of International Patent Application No. PCT/GB2007/001494, filed on Apr. 24, 2007, which claims priority to United Kingdom Patent Application No. GB0608150.9, filed on Apr. 24, 2006, the disclosures of which are expressly incorporated by reference herein in their entirety.

DESCRIPTION OF THE INVENTION

This invention relates to camera battery packs and is particularly or although not exclusively applicable to camera battery packs for use with video camera on pan and tilt mountings.

The object of the invention is to provide a camera battery pack which is conveniently mounted with the camera and which increases the versatility of the mounting. There is a need in particular for lightweight cameras to have enhanced fore and aft adjustment on the mounting to achieve a balanced position on a pan and hilt head. Small cameras have small batteries and there is a need especially when auxiliary devices are to be used to carry an extra power supply. When a camera is used off mounting with an additional power supply it is still important to balance the camera/power supply.

This invention provides a battery pack for mounting a video camera on a stand, the pack having first coupling means on one side for engaging the camera and second coupling means on the other side for engaging the stand, wherein the first and second coupling means are of complementary form whereby the camera may be mounted on the battery pack and the battery pack mounted on the stand or the camera may be mounted directly on the stand.

It is preferred that at least one of said coupling means permits linear adjustment between the battery pack and the component with which it is engaged.

More specifically the first coupling means may permit linear adjustment of the camera with respect to the battery pack and the second coupling means may permit linear adjustment of the battery pack with respect to the stand.

In a preferred embodiment of the invention the first and second coupling means permit parallel linear adjustment of the camera with respect to the pack and the pack with respect to the stand.

Further the first coupling means which affords linear adjustment of the battery pack with respect to the camera may provide adjustment in parallel with the optical axis of the camera.

In any of the above arrangements the first coupling means on the battery pack may comprise a slideway having means to receive and lock a slide on the camera in position and the second coupling means on the battery pack may comprise a slide for engagement in a slideway on the stand having means to lock the slide in a required position on the slideway.

In the latter arrangement the slideway on said one side of the battery pack may have a surface along which the camera mounting plate is slidable parallel to the optical axis of the camera and clamp means are located on either side of the slideway for locking the slide in any position of adjustment along the slideway.

By way of example the clamping means may comprise a fixed jaw on one side of the slideway and an adjustable jaw on the other side of the battery pack movable towards and away from the fixed jaw to clamp the camera mounting plate between the jaws on the battery pack.

The camera mounting plate may be of dovetail cross section to engage on the slideway of the battery pack and the jaws on the battery pack are shaped to engage with the inclined sides of the plate.

In any of the latter arrangements the slide of said second coupling means on the battery pack may be an elongate slide to be held captive in a slideway on the stand and means are provided for locking the slide in any position of adjustment along the slideway.

More specifically the slide of the second coupling means may be an elongate dovetail cross section member and the slideway may be an elongate dovetail cross section slideway in which the slide is engageable and held captive and the clamping device is provided on one side of the slideway for bearing against the slide to lock the slide in any position throughout a range of adjustment with respect to the slideway.

The following is a description of a specific embodiment of the invention, reference being made to the accompanying drawings in which.

Figure 1:
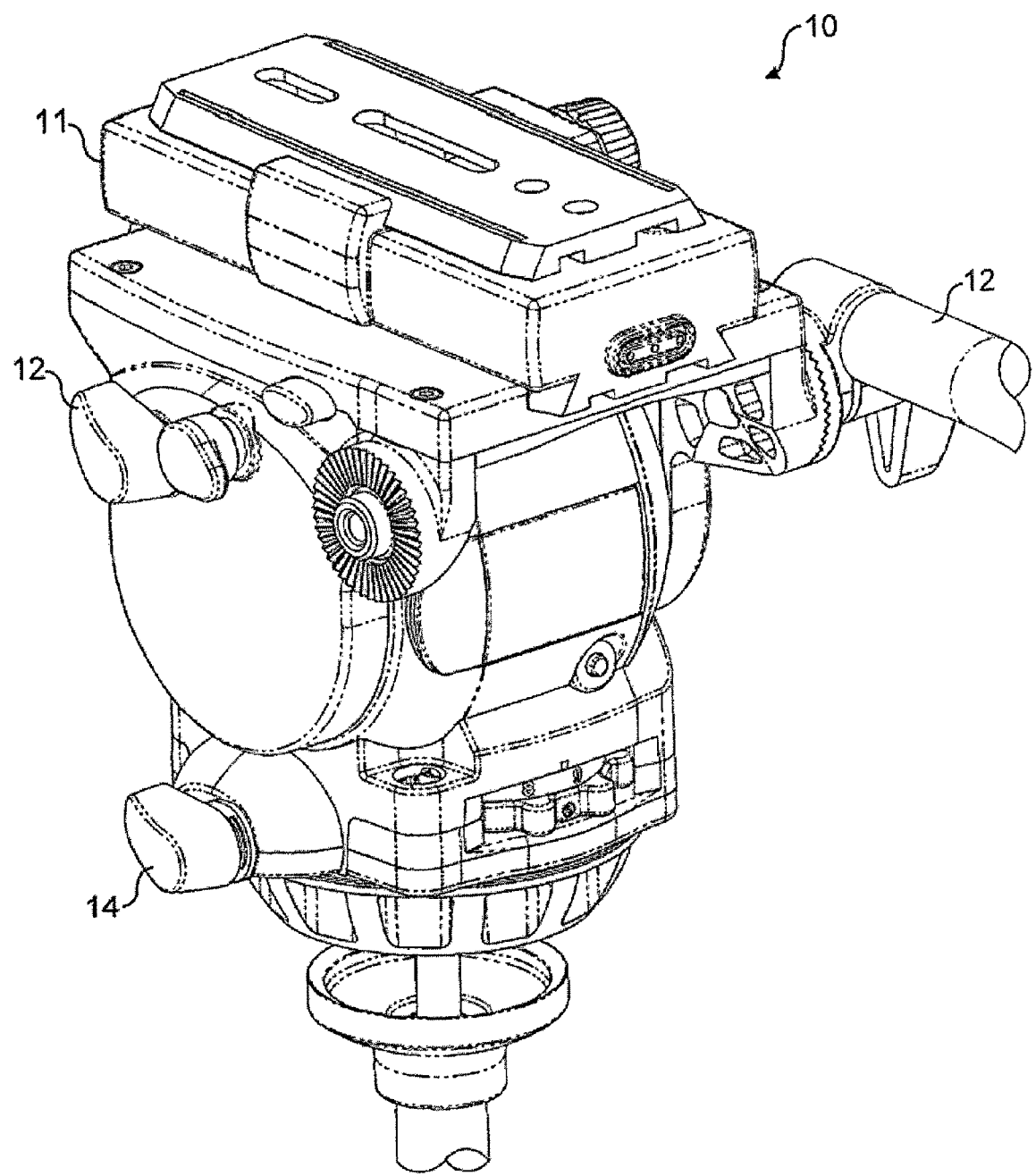
FIG. 1 is a perspective view of a pan and tilt head for a video camera including a battery container and a camera mounting plate.
Figure 2:
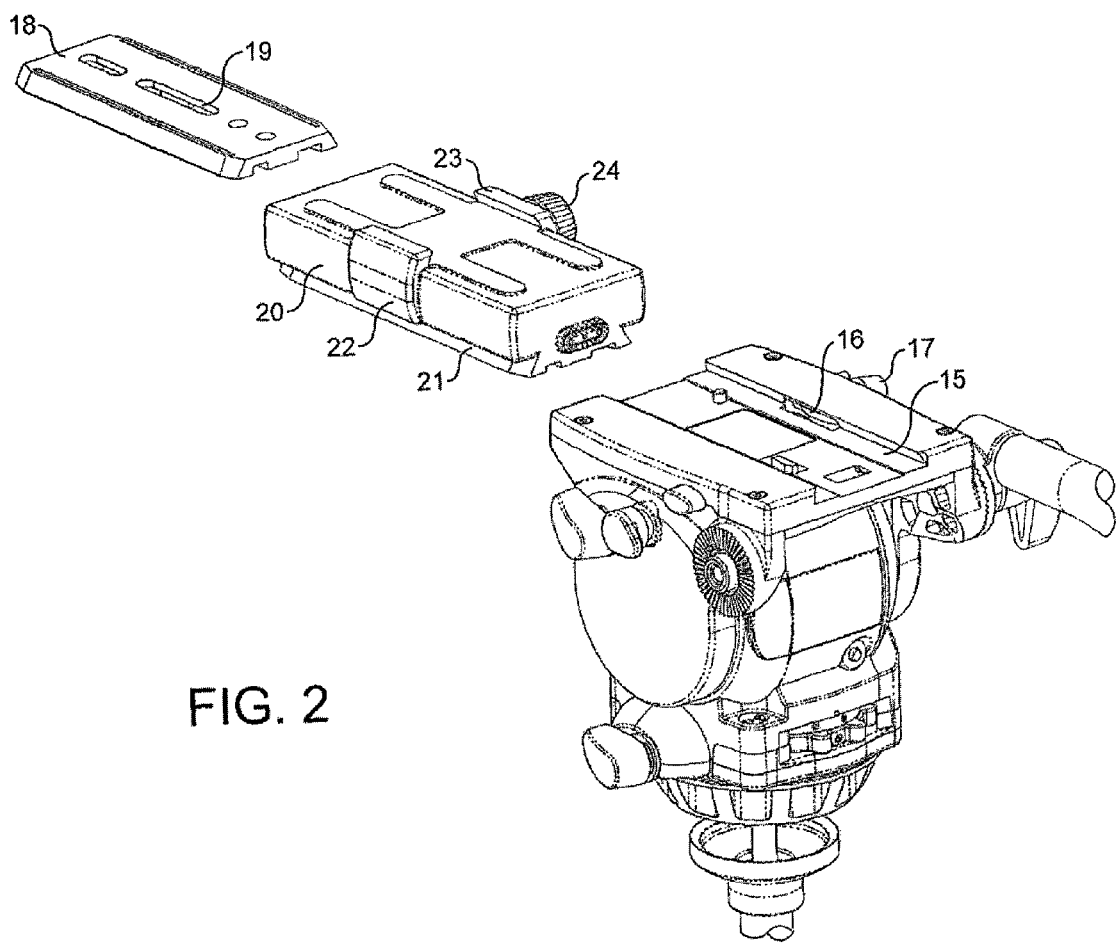
FIG. 2 is an exploded perspective view of the pan and tilt head, battery container and camera mounting plate of FIG. 1.

Referring firstly to FIG. 1 of the drawings, there is shown a pan and tilt head indicated generally at 10 for a video camera. The head shown in the drawings is of the form described and illustrated in our UK Patent Publication No. 2189042.

As described in our UK Patent Publication No. 2189042, the head comprises an upper mounting plate 11 for the camera to which an arm 12 is secured for the cameraman to manoeuvre the mounting plate. The mounting plate tilts about the horizontal axis and a counterbalancing mechanism incorporated in the head ensures that the camera is fully counterbalanced in any position of rotation on the head that it is moved to. The counterbalancing mechanism is adjustable by the control knob 12 to vary the counterbalancing force generated to cater for cameras of different weights on the mounting plate. The pan and tilt head provides also for pan movement of the head about a vertical axis. Adjustable dampers are provided for damping hand movement of the head in either pan or tilt axes and control knobs 14 are provided for adjusting damping effect provided.

The upper face of the camera mounting plate 11 has a conventional dovetail section slot 15 of a standard form to suit the standard dovetail section camera mounting plate normally used. A locking arrangement is provided for locking a dovetail section plate in any position of movement along the dovetail section slot comprising a brake member 16 mounted on one side of the slot with a lead screw for moving the member inwardly and outwardly of the slot to clamp a plate in the slot. The lead screw has an enlarged head 17 for adjustment of the lead screw as required.

The camera mounting plate is indicated at 18 and as can be seen is of dovetail section form to engage in the slot 15. The plate has fastening devices which extend to fasten the plate to the underside of the camera. A battery unit for holding batteries for powering the camera is indicated at 20. The battery unit is formed with a dovetail section plate 21 on its underside which replicates the dovetail section plate 18 attached to the camera. The plate 21 is engageable in the slideway 15 on the camera mounting plate and can be clamped into position along the slideway by the clamp 16, 17.

The battery unit has an upstanding integral clamping member 22 on one side of the battery unit and a separate clamping member 23 on the other side of the unit secured by the clamping screw (not shown) on which a knob 24 is mounted for tightening the screw as required. The camera mounting plate 18 is located on the upper side of the battery unit sliding between the fixed clamping member 22 and separate clamping member 23 and when in the required position is locked into place by tightening the clamping member 23 with engagement with the plate.

The battery unit is coupled to the camera by power supply for the camera capable of holding a larger battery unit or units than would normally be provided in the camera body itself.

The range of fore and aft movement normally provided for a camera on a mounting head is limited to the extent to which the mounting plate of the camera can remain in contact with the locking member 16. By incorporating a battery unit between the mounting head and camera mounting plate, the extent of adjustment fore and aft the camera on the mounting head is significantly increased by virtue of the fact that the camera mounting plate can be adjusted fore and aft the battery unit and the battery unit can be adjusted fore and aft on the pan and tilt head.

Figure 3:
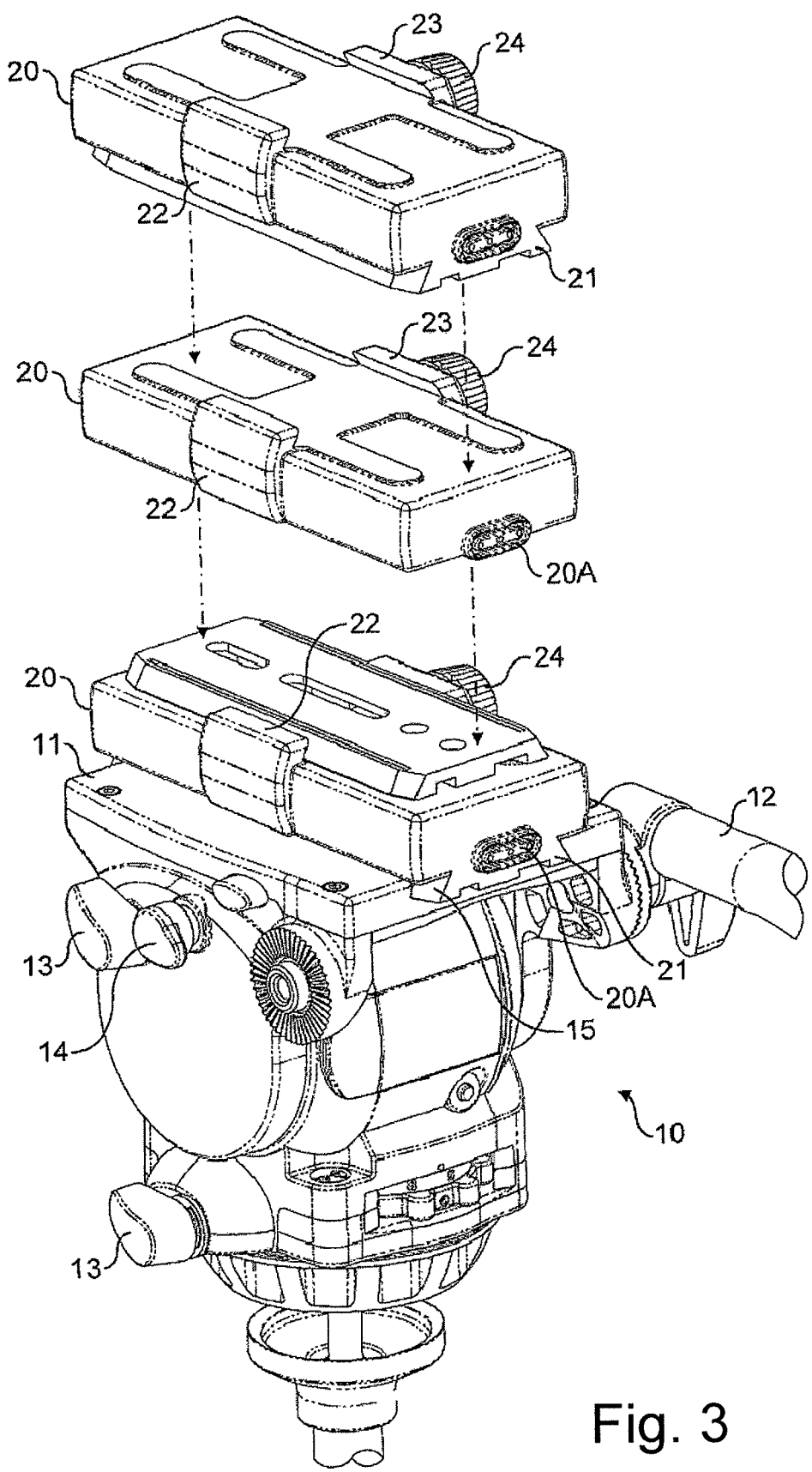
FIG. 3 is a perspective view of a pan and tilt head for mounting a camera with a stack of three battery packs to provide an enhanced power supply for the camera/camera auxiliaries.
Figure 4:
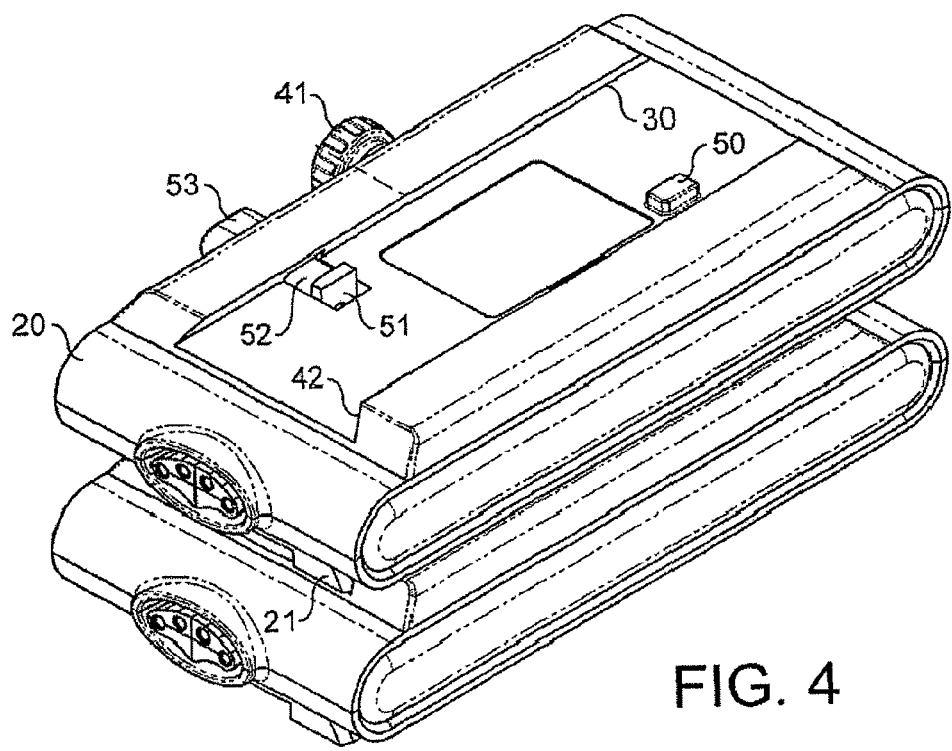
FIGS. 4 and 4a are perspective views of a pair of battery packs stacked one on top of the other and having a modified form of coupling on either side of each pack.
Figure 4A:
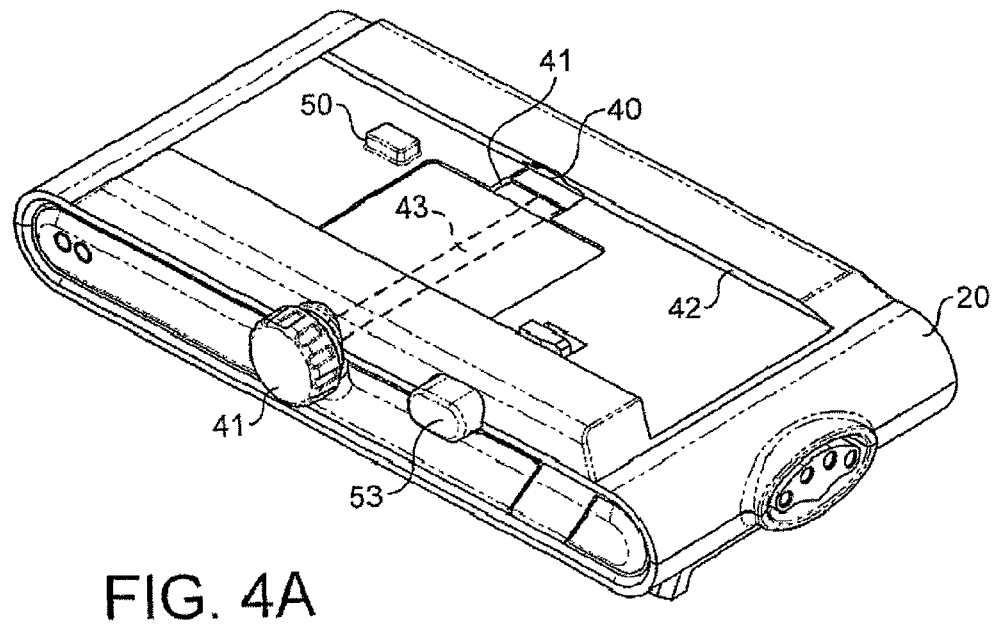
Figure 5:
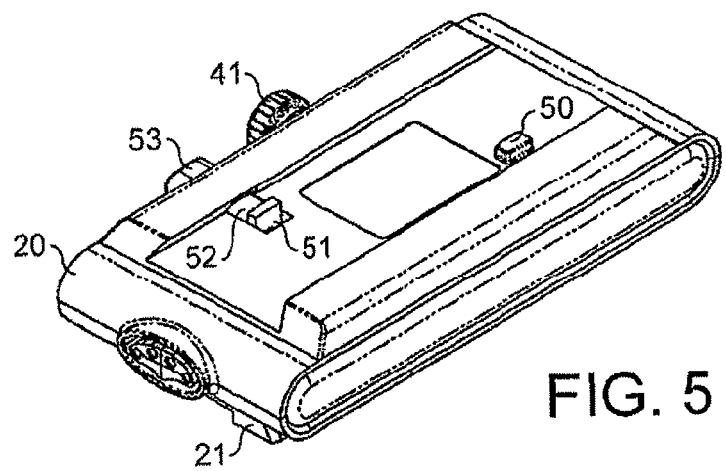
FIG. 5 is a perspective view of a single pack of the form shown in FIG. 4 looking at the upper face of the pack.

Referring now to FIG. 3 of the drawings, there is shown a pan and tilt head 10 for a TV/video camera and three battery packs 20 to be mounted as a stack between the camera support plate 11 of the mounting and the camera itself. The pan and tilt head and battery packs 20 are all of the form described and illustrated above. In the arrangement described above only a single battery pack 20 was located on the support plate to receive the camera. In the following arrangement a stack of three battery packs 20 is provided between the support plate of the head and the camera.

As before, each pack has a dovetail section plate 18 on its underside to engage in a dovetail section slot in the support plate 11 of the mounting or in the clamping arrangement provided on the upper side of the underneath battery pack. The clamping arrangement of each battery pack comprises a fixed clamping member 22 on one side of the pack and an adjustable clamping member 23 on the other side of the pack. The mounting plate 18 of the camera or the battery pack above engages in the clamping arrangement of the battery pack below and is clamped in place by the clamping member 23 to form a rigid stack battery pack between the support plate 11 of the camera and the camera itself.

The battery packs 20 have power sockets indicated at 20a to enable the packs to be coupled together in parallel or in series or to be connected individually to provide a source or sources of power for the camera and/or other auxiliary devices connected with the camera.

By providing more than one battery pack, increased power can be made available or a greater reserve of power can be provided to increase the time for which the camera can be used between recharging of the battery packs. The battery packs also provide a useful source of power for auxiliary devices associated with the camera.

Referring now to FIGS. 3 to 8, there is shown a modified form of battery pack 20 having a dovetail section plate 21 extending along the length of its lower side for engagement in a dovetail section slot in the support plate on the pan and tilt head or on the battery pack below.

The fixed and adjustable clamping members 22, 23 of the previous form of battery pack described are dispensed with and the upper side of the battery pack has a dovetail section groove or slot 30 extending the length of the pack to receive the dovetail section plate 21 of the pack above or, in the case of the uppermost battery pack, the dovetail section plate on the underside of the camera.

To secure the plate 21 in position in the slot 30, a clamping member 40 is housed in a recess 41 in one side 42 of the slot and is drawn outwardly to clamp the plate by a lead screw 43 operated by a thumb wheel 44 mounted on the opposite side of the pack. The battery pack or camera can thereby be locked in position along the slideway 30. The clamping member 40 is released to free the pack or camera by turning the thumb wheel 44 in the opposite direction.

The slot 30 has a fixed stop 50 located partway along the slot towards one side of the slot and a movable stop 51 mounted on the plunger 52 extending laterally of the battery pack on the other side of the pack. The plunger 52 has a head 53 on the outer side of the battery pack to enable the head 51 to be depressed across the slot 30.

Figure 6:
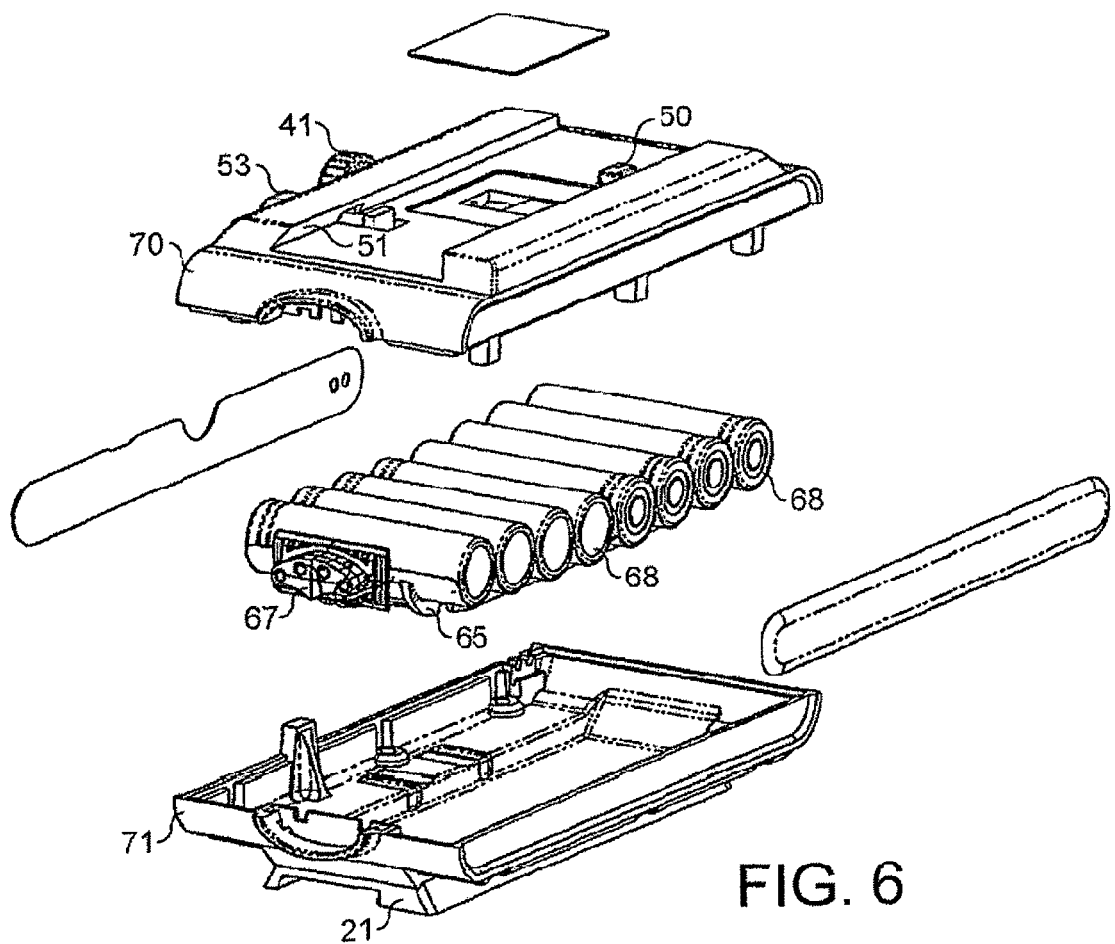
FIG. 6 is an exploded perspective view of the pack as shown in FIG. 5.
Figure 7:
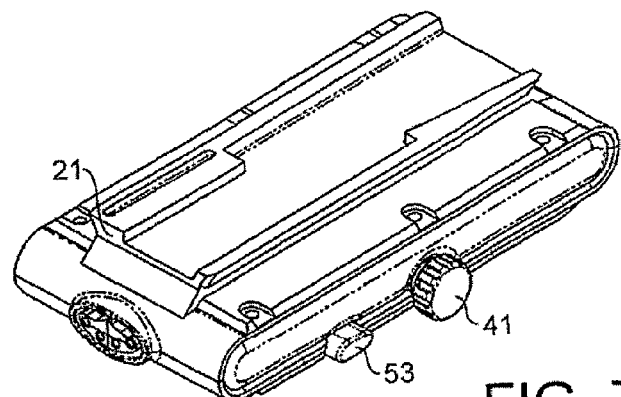
FIG. 7 is a perspective view of the pack of FIG. 5 looking at the underside of the pack.

The dovetail section plate 21 on the underside of a battery pack 20 is illustrated in FIG. 6. The plate has a wide slot 60 extending from end to end of the dovetail section. One side of the slot is formed with an end stop 61 facing towards one end of the slot to engage the stop 50 in the slideway of the battery pack below to limit movement of the battery pack in one direction along the slideway. The other side of the slot 60 has a shallow end stop 62 facing in the other direction along the slideway to engage the head 51 of the releasable plunger 52. The spacing of the abutments 61, 62 is designed to locate the battery pack above symmetrically on the battery pack below. As the battery pack above is slid on to the battery pack below, the abutment 62 will eventually come into engagement with the stop 50 to prevent further movement of the battery pack and at the same time the abutment 51 will slide past the abutment 61 and will then snap behind the abutment to lock the battery pack above in position on the battery pack below. The battery pack above can be released by depressing the abutment 51 through the head 53 of the plunger 52 which disengages the head from the abutment 61 lying the head to slide past the abutment as the battery pack is moved out of line with the pack below.

Figure 8:
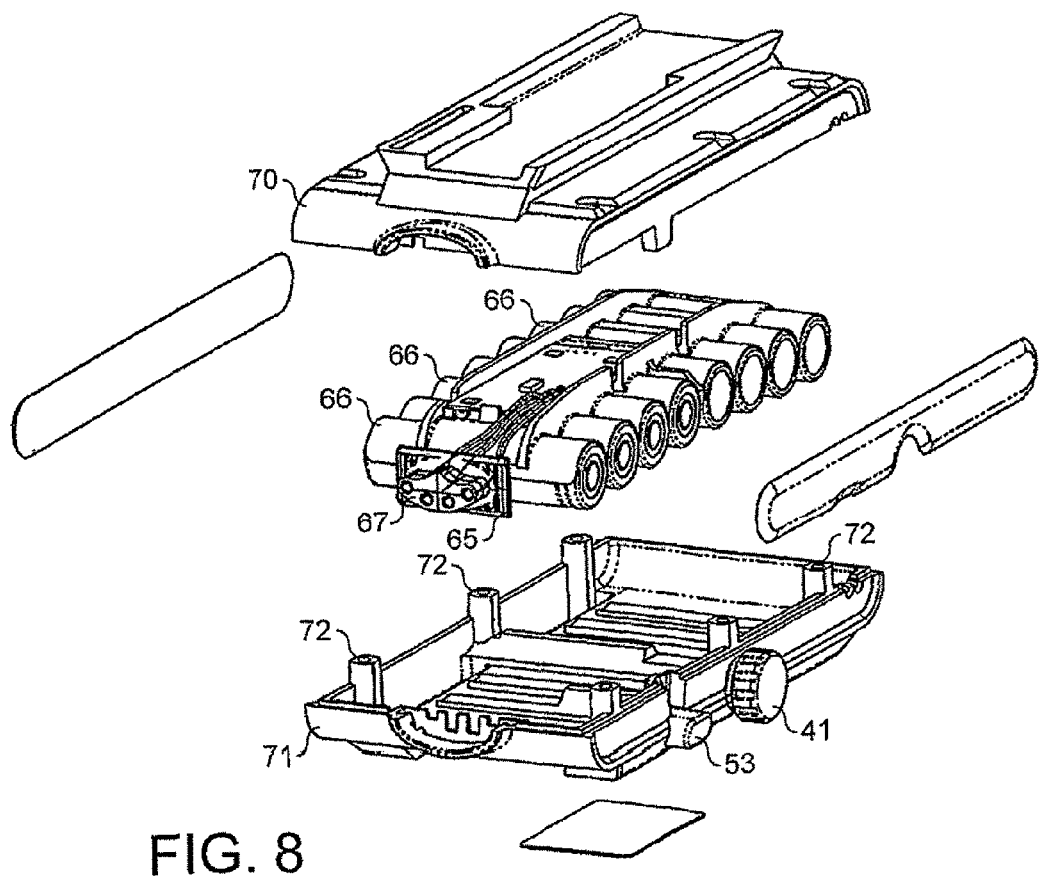
FIG. 8 is an exploded perspective view of the pack of FIG. 6.

FIGS. 6 and 8 show further details of the battery-pack in exploded form. The pack holds a cartridge 65 on which a set of batteries 66 is mounted with a socket 67 at one end of the cartridge to be located in an opening at the end of the battery pack for coupling the pack to another pack or the camera or an auxiliary to be powered by the pack.

The upper and lower parts 70, 71 of the pack are secured together by screws extending through the lower part of the pack into threaded sockets 72 loaded into the upper part of the pack.

What is claimed is:

1. A battery pack for mounting to a camera that includes a stand, the pack having first coupling means on one side for engaging the camera and second coupling means on an opposite side for engaging the stand, wherein the first and second coupling means are of complementary form whereby the camera may be mounted on the battery pack and the battery pack mounted on the stand or the camera may be mounted directly on the stand; wherein the first coupling means permits linear adjustment of the camera with respect to the battery pack and the second coupling means permits linear adjustment of the battery pack with respect to the stand; and in that the first and second coupling means permit linear adjustment of the camera with respect to the pack and linear adjustment of the pack in a parallel direction with respect to the stand.

2. A battery pack as claimed in claim 1, wherein the first coupling means which affords linear adjustment of the battery pack with respect to the camera provides adjustment in parallel with the optical axis of the camera.

3. A battery pack as claimed in claim 1, wherein the first coupling means on the battery pack comprise a slideway having means to receive and lock a slide on the camera in position and the second coupling means on the battery pack comprise a slide for engagement in a slideway on the stand having means to lock the slide in a required position on the slideway.

4. A battery pack as claimed in claim 3, wherein the slideway on said one side of the battery pack has a surface along which a slide on the camera is slidable parallel to the optical axis of the camera and clamp means located on either side of the slideway for locking the slide in any position of adjustment along the slideway.

5. A battery pack as claimed in claim 4, wherein the clamping means comprise a fixed jaw on one side of the slideway and an adjustable jaw on the other side of the battery pack movable towards and away from the fixed jaw to clamp the camera mounting plate between the jaws on the battery pack.

6. A battery pack as claimed in claim 5, wherein the camera mounting plate is of dovetail cross section to engage on the slideway of the battery pack and the jaws on the battery pack are shaped to engage with the inclined sides of the plate.

7. A battery pack as claimed in claim 3, wherein the slide of said second coupling means on the battery pack is an elongate slide to be held captive in a slideway on the stand and means are provided for locking the slide in any position of adjustment along the slideway.

8. A battery pack as claimed in claim 7, wherein the slide of the second coupling means is an elongate dovetail cross section member and the slideway is an elongate dovetail cross section slideway in which the slide is engageable and held captive and the locking means for the slideway comprises a clamping device provided on one side of the slideway for bearing against the slide to lock the slide in any position throughout a range of adjustment with respect to the slideway.

9. A stack of two or more of the battery packs as claimed in claim 1 for location between a camera mounting and a camera to provide a power supply or supplies for the camera or camera auxiliary devices.

10. A video camera, a stand for the camera, and a battery pack as claimed in claim 1 mounted between the video camera and the stand for the camera.

11. A battery pack as claimed in claim 1 mounted to a video camera, said first coupling means of the battery pack permitting linear adjustment of the pack with respect to the camera.

12. A video camera and the battery pack as claimed in claim 1 mounted on the camera stand, said second coupling means of the battery pack permitting linear adjustment of the pack with respect to the stand.

13. A battery pack for a camera comprising:
a first side configured to removably attach to a camera stand;
a second side configured to removably attach to a camera, the second side being complementary to the first side such that the camera may attach directly to the camera stand when the battery pack is not present; and
at least one mechanism configured to linearly adjust the camera with respect to the camera stand.

14. The battery pack of claim 13, wherein the at least one mechanism configured to linearly adjust the camera is integrally formed with at least one of the first side and the second side.

15. The battery pack of claim 13, wherein the at least one mechanism configured to linearly adjust the camera is comprised of a first mechanism and a second mechanism.

16. The battery pack of claim 15, wherein:
the first mechanism is integrally formed with the first side, the first mechanism being configured to linearly adjust the battery pack and camera relative to the camera stand; and
the second mechanism is integrally formed with the second side, the second mechanism being configured to linearly adjust the camera relative to the battery pack and the camera stand.

17. The battery pack of claim 13, wherein the at least one mechanism configured to linearly adjust the camera is configured to provide the adjustment in a direction parallel to an optical axis of the camera.

18. The battery pack of claim 13, wherein the at least one mechanism configured to linearly adjust the camera comprises a slideway, the slideway comprising a means to receive a slide and a means to lock a slide.

19. The battery pack of claim 13, wherein the at least one mechanism configured to linearly adjust the camera comprises a slide configured to engage a slideway.

20. The battery pack of claim 18, wherein the means to lock a slide comprises a fixed jaw and an adjustable jaw.

* * * * *